(12) United States Patent
Sugata et al.

(10) Patent No.: US 6,913,102 B2
(45) Date of Patent: Jul. 5, 2005

(54) WORKING VEHICLE WITH TRAVERSING SYSTEM

(75) Inventors: Takashi Sugata, Osaka (JP); Tsutomu Ueda, Osaka (JP)

(73) Assignee: TCM Corporation, Osaka (JP)

( * ) Notice: Subject to any disclaimer, the term of this patent is extended or adjusted under 35 U.S.C. 154(b) by 33 days.

(21) Appl. No.: 10/332,932

(22) PCT Filed: Jun. 15, 2001

(86) PCT No.: PCT/JP01/05159

§ 371 (c)(1),
(2), (4) Date: Jan. 14, 2003

(87) PCT Pub. No.: WO02/06111

PCT Pub. Date: Jan. 24, 2002

(65) Prior Publication Data

US 2003/0155163 A1 Aug. 21, 2003

(30) Foreign Application Priority Data

Jul. 14, 2000 (JP) ........................................ 2000-213581
Jul. 24, 2000 (JP) ........................................ 2000-221588

(51) Int. Cl.[7] ............................ B60K 1/04; B60K 7/00; B62D 7/14; B66F 9/075

(52) U.S. Cl. ...................... 180/253; 180/236; 180/242; 180/65.6; 180/68.5; 180/308; 180/414

(58) Field of Search ................................ 180/236, 237, 180/242, 246, 253, 264, 267, 65.6, 65.7, 68.5, 308, 408, 411, 414, 211, 212, 213, 214, 24; 187/222

(56) References Cited

U.S. PATENT DOCUMENTS

| 4,219,094 A | * | 8/1980 | Sturgill ........................ 180/236 |
| 4,268,216 A | * | 5/1981 | Copie ........................... 414/719 |
| 4,498,554 A | * | 2/1985 | Young et al. ................ 180/236 |
| 4,557,346 A | * | 12/1985 | Guignard et al. ........... 180/242 |
| 4,823,899 A | | 4/1989 | Ron |
| 4,986,387 A | | 1/1991 | Thompson et al. |
| 5,213,143 A | * | 5/1993 | Policky et al. .............. 180/236 |
| 5,335,739 A | * | 8/1994 | Pieterse et al. ............. 180/242 |
| 5,343,974 A | * | 9/1994 | Rabek ......................... 180/216 |
| 5,570,754 A | * | 11/1996 | Stimson ...................... 180/234 |
| 5,924,512 A | * | 7/1999 | Wada .......................... 180/253 |
| 5,983,612 A | * | 11/1999 | Bauswell et al. .......... 180/68.5 |

FOREIGN PATENT DOCUMENTS

| JP | 52084649 A | 7/1977 |
| JP | 52147834 | 8/1977 |
| JP | 56163970 A | 12/1981 |
| JP | 03070682 A | 3/1991 |
| JP | 07069078 A | 3/1995 |
| JP | 09058510 A | 3/1997 |

* cited by examiner

Primary Examiner—Peter C. English
(74) Attorney, Agent, or Firm—D. Peter Hochberg; Sean Mellino; Katherine R. Vieyra

(57) ABSTRACT

A working vehicle with a traversing system wherein a front wheel is installed on a swing member rotatable about a vertical axis relative to a body and including a rotating cylinder for rotating the swing member. The entire part of the front wheel is formed compact in connection with a drivingly running device stored in the swing range of the front wheel. A battery mountable on the body comprises a wide front part movable in the vehicle longitudinal direction between rear wheels in the straight forward running attitude. A narrow rear part is positioned between the rear wheels in the transverse running attitude, whereby the attachment and detachment of the wheel can be preformed easily and can be mounted stably.

3 Claims, 13 Drawing Sheets

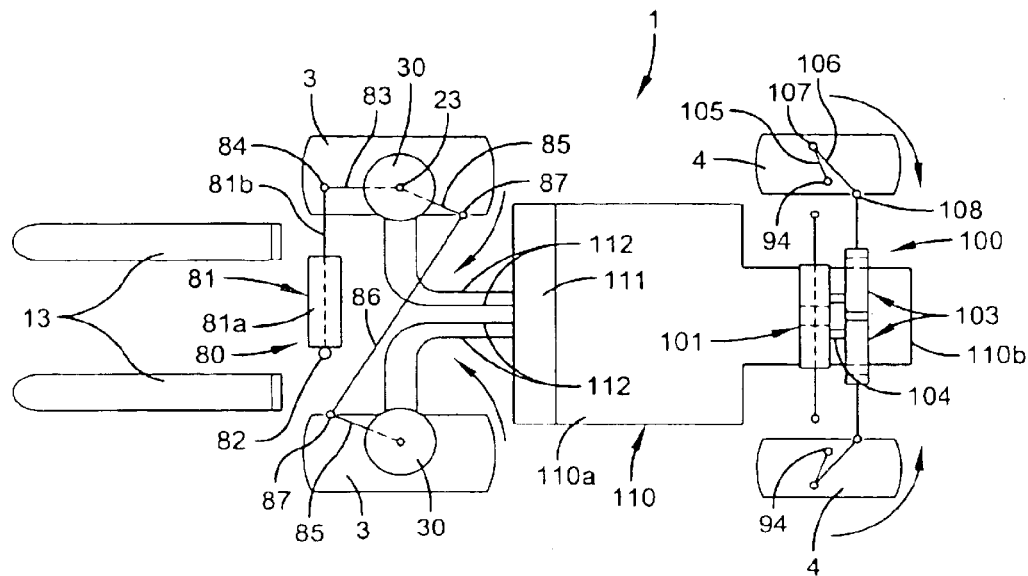
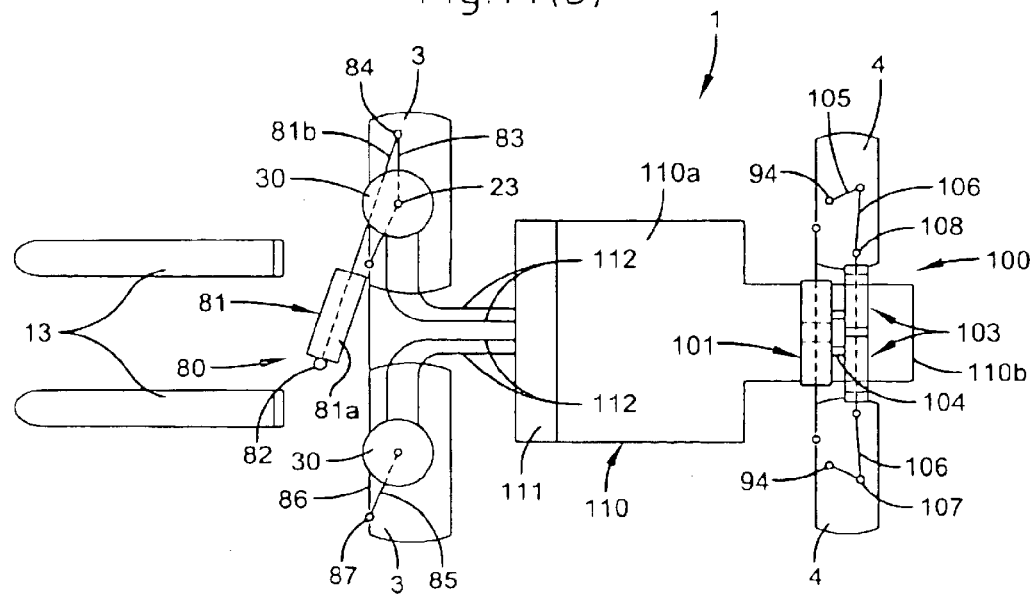

WORKING VEHICLE WITH TRAVERSING SYSTEM

TECHNICAL FIELD

The present invention relates to a work vehicle with lateral travel system which can be switched to lateral travel.

BACKGROUND ART

Vehicles conventionally regarded as having a lateral travel system include large-scale transporters, some loaders, and the like, and in fork lift devices, these include reach-type electric vehicles. Furthermore, there are also side fork lifts for handling long materials, which have a mast or forks installed in a lateral direction with respect to the movement of the vehicle. However, there is no counter-type fork lift which is able to provide functions similar to side forks, in addition to standard tasks, by performing lateral movement. In order to achieve a fork lift of this kind, it is necessary to steer the front wheels, which are the drive wheels, in a perfectly lateral direction.

More specifically, in a conventional fork lift 1a as illustrated in FIG. 15, a pair of front wheels (drive wheels) 3a are provided on the left- and right-hand sides on the front portion of the vehicle body 2a, a pair of rear wheels (steering wheels) 4a are provided on the left- and right-hand sides on the rear portion thereof, and a driver's area 5 is provided above the front portion of the vehicle body 2a. Vertically extendable masts 6 are provided on the front end section of the vehicle body 2a, rotatably in the front/rear direction by means of coupling axle 7a extending in the lateral direction of the vehicle, and a tilt cylinder 8 for performing front/rear rotation is provided between the vehicle body 2a and the masts 6.

The masts 6 comprise a pair of outer frames 9 arranged on the left- and right-hand sides on the fork lift 1a, and a pair of inner frames 10 that are arranged on the left- and right-hand sides and can be guided by the outer frames 9 to ascend or descend, a lift cylinder 11 being provided between the outer frames 9 and inner frames 10. Furthermore, lift bracket 12 that can be guided by the inner frames 10 to ascend or descend is also provided, and a pair of forks 13 are provided on the left- and right-hand sides on this lift bracket 12, via a pair of finger bars constituting upper and lower finger bars.

A seat 15 and a steering wheel 16, or the like, disposed to the front of this seat 15 are provided in the driver's area 5, and above these elements, a head guard 19 is provided via front pipes 17 and rear pipes 18 projecting from the main body 2a. A counter weight 20 is provided on the main body 2a, to the rear of the seat 15.

However, in a conventional fork lift 1a such as that described above, since the front wheels 3a are driven by a common travel drive train, it is not possible to steer these front wheels 3a in a perfectly lateral direction, and hence lateral travel cannot be achieved.

Moreover, since there are vehicle axles between the left- and right-hand front wheels 3a and between the left- and right-hand rear wheels 4a, and the battery must be installed in a position which avoids these axles, then these restrictions mean that installation and battery removal, in other words, maintenance tasks, cannot be performed readily. Moreover, there is also the possibility that the battery installation position will raise the center of gravity, leading to loss of stability.

DISCLOSURE OF THE INVENTION

Accordingly, it is a first object of the present invention to provide a work vehicle with lateral travel system, whereby the front wheels forming drive wheels can be steered so as to face directly sideways, and a portion of travel drive trains operatively connected to the front wheels can be formed in a compact manner.

Moreover, it is a second object of the present invention to provide a work vehicle with lateral travel system whereby a battery can be installed and removed readily, whilst also being mounted in a stable manner.

In order to achieve the first object, the present invention is a work vehicle with lateral travel system, wherein a pair of front wheels and a pair of rear wheels are respectively provided on the left- and right-hand sides on a vehicle body in such a manner that they are steerable to a 90 degree position, the pair of front wheels being installed on turning members provided rotatably about vertical axes with respect to the vehicle body, rotating means for causing the rotating members to rotate being provided, and the pair of front wheels being operatively connected to travel drive trains accommodated within the turning radius of the front wheels.

According to the aforementioned composition, during normal travel, the left- and right-hand front wheels and the left- and right-hand rear wheels are oriented in the front/rear direction. When the vehicle is switched from normal travel to lateral travel, firstly, the rotating means is operated and the turning members are caused to rotate about the vertical axes, thereby making it possible to steer the front wheels to a 90° position (facing directly sideways) with respect to the vehicle body. After steering the front wheels to face directly sideways in this manner, by driving the front wheels in the forward or reverse direction by means of the travel drive trains, it is possible to move the work vehicle laterally, leftwards or rightwards. In this case, the rear wheels are steerable freely by means of a turning caster system, or alternatively, they may be steered forcibly similarly to the front wheels. In this case, since the travel drive trains operatively connected to the left- and right-hand pair of front wheels are respectively accommodated inside the turning radius of the front wheels, it is possible to make the overall composition compact.

Moreover, in order to achieve the second object, the present invention is a work vehicle with lateral travel system, wherein a pair of front wheels and a pair of rear wheels are respectively provided on the left- and right-hand sides on a vehicle body in such a manner that they are steerable to a 90 degree position, the pair of front wheels being respectively installed rotatably about vertical axes with respect to the vehicle body, front wheel turning means for causing rotation being provided, the pair of rear wheels being respectively provided-rotatably about vertical axes with respect to the vehicle body, rear wheel turning means for causing rotation being provided, and a battery mountable in the vehicle body being constituted by a broad front section which is movable in the longitudinal direction of the vehicle between the rear wheels when in a forward/reverse travel attitude, and a narrow rear section which can be positioned between the rear wheels when in a lateral travel attitude.

According to the aforementioned composition, during normal travel, the left- and right-hand front wheels and the left- and right-hand rear wheels are orientated in the front/rear direction. When the vehicle is switched from normal travel to lateral travel, for example, a lever type lateral travel mode switch is operated, and front wheel turning means and rear wheel turning means are operated. In other words, by operating the front wheel turning means, the front wheels are rotated about the vertical axes and can be steered to a 90° position (facing directly sideways) with respect to the vehicle body, and by operating the rear wheel turning means, the rear wheels can be steered to a 90° position (facing directly sideways) with respect to the vehicle body. In this way, after steering both the front wheels and the rear wheels to face directly sideways, the work vehicle can be caused to travel laterally, leftwards or rightwards.

Moreover, since the broad front section of the battery can be moved without obstruction in the longitudinal direction of the vehicle, between the rear wheels when said wheels are in forward/reverse travel attitude, the battery can be installed and removed to and from the vehicle, readily and swiftly, via the rear side of the vehicle, and hence maintenance can be performed readily. Furthermore, since the narrow rear section of the battery mounted in the vehicle body is positioned between the rear wheels, it is possible to steer the rear wheels to lateral travel attitudes without obstruction, and moreover, a large-scale battery can be mounted in the middle to lower portion of rear part of the vehicle, thereby lowering the center of gravity and thus achieving a stable work-vehicle.

Furthermore, in a preferred first embodiment of the work vehicle with lateral travel system according to the present invention, the pair of front wheels are installed respectively on the turning members by means of laterally orientated wheel drive shafts, travel drive motors being provided on the vehicle body in a state wherein the drive shafts thereof are positioned facing downwards on the vertical axis of the turning member, and rotation transmission means for operatively connecting the drive shafts to the wheels being provided in the turning members.

According to this first embodiment, it is possible to transmit the rotation of the drive shafts of the travel drive trains to the wheel drive shafts, by means of rotation transmission means. In this case, it is possible to position the supply of electrical power to the travel drive motors fixed to the main body, independently of the turning members, and hence they can be installed simply and efficiently.

In a preferred second embodiment of the work vehicle with lateral travel system according to the present invention, the travel drive trains are respectively installed on the pair of turning members, and the front wheels are operatively connected to the laterally oriented drive shafts.

According to this second embodiment, it is possible to transmit the rotation of the drive shafts of the travel drive trains to the front wheels, and since the front wheels are here formed integrally with the respective travel drive trains, they can be steered to a 90° position readily and smoothly.

Moreover, in a preferred third embodiment of a work vehicle with lateral travel system according to the present invention, masts are provided on the front end of the vehicle body and forks are provided on these masts.

According to this third embodiment, during normal travel, the left- and right-hand front wheels and the left- and right-hand rear wheels are orientated in the front/rear direction, and by operating a lift lever, the forks can be raised or lowered along the masts to perform prescribed fork tasks. Thus, whilst achieving a configuration which is capable of standard fork tasks in this way, it is also possible to perform lateral travel by steering the front drive wheels to face directly sideways, whereby, for example, transportation of long objects can be performed readily by means of the forks.

BRIEF DESCRIPTION OF THE DRAWINGS

FIG. 14 is an schematic plan view of the same work vehicle with lateral travel system, FIG. 14(a) showing a state during normal travel and FIG. 14(b) showing a state during lateral travel.

BEST MODE FOR CARRYING OUT THE INVENTION

Figure 15:
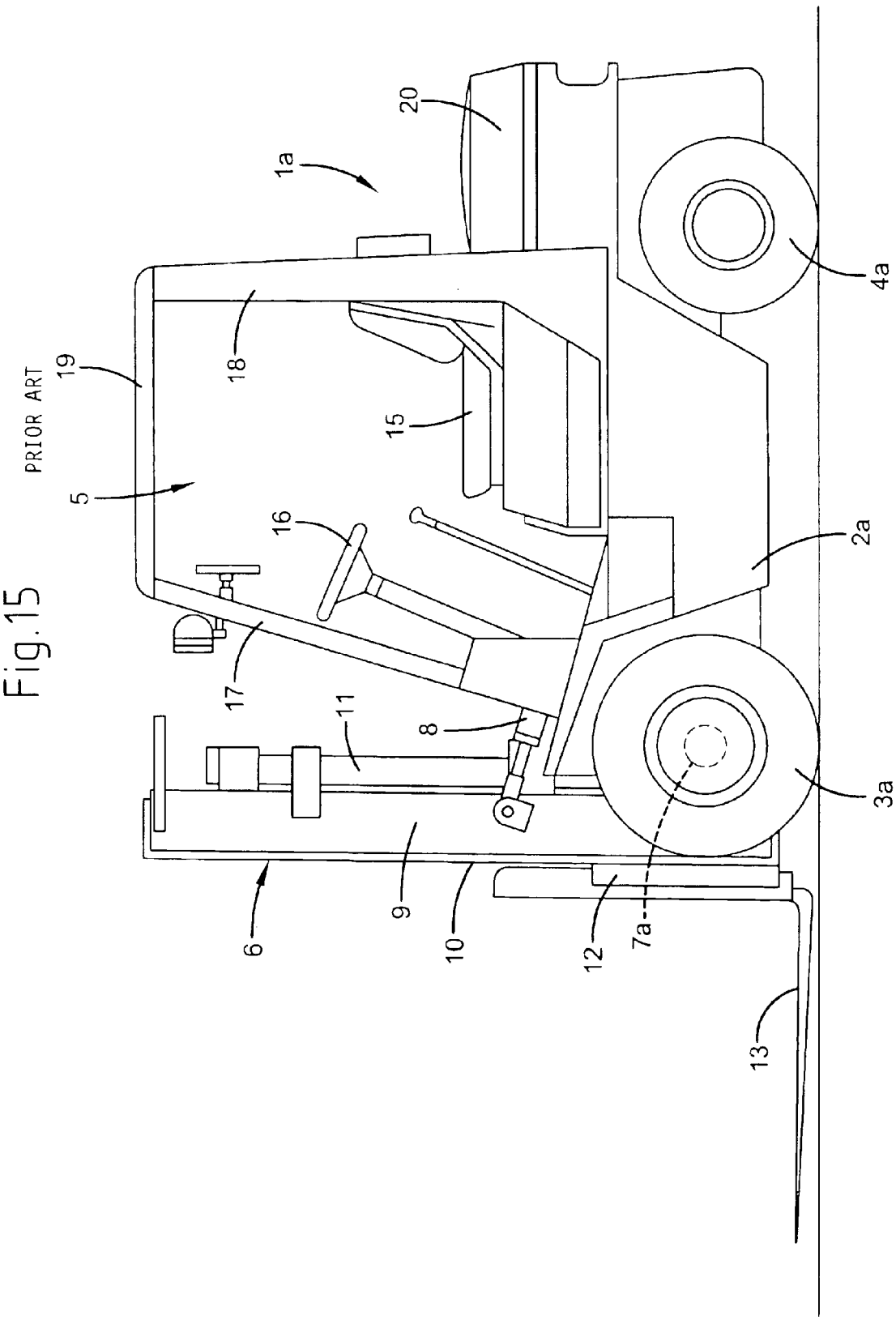
FIG. 15 is a side view of a work vehicle according to a prior art.

Below, a first embodiment of the present invention is described with reference to FIG. 1 to FIG. 6. In the first embodiment, description of constituent elements which are the same or constituent elements which are virtually the same as the prior art example (FIG. 15) described previously, are labelled with the same reference numerals, and detailed description thereof is omitted here.

In other words, 1 is a fork lift, 2 is a vehicle body, 3 are front wheels (drive wheels), 4 are rear wheels (steering wheels), 5 is a driver area, 6 is a mast, 7 is a coupling axle, 8 is a tilt cylinder, 9 is an outer frame, 10 is an inner frame, 11 is a lift cylinder, 12 is a lift bracket, 13 is a fork, 15 is a seat, 16 is a steering wheel, 17 is a front pipe, 18 is a rear pipe, 19 is a head guard, and 20 is a counterweight.

The pair of front wheels 3 are provided such that they are respectively steerable through 90 degrees (steerable in a perfectly lateral direction) with respect to the vehicle body 2. More specifically, a cylindrical member 21 is fixed to the vehicle body 2, and turning members 22 are provided rotatably about vertical axes 23 with respect to cylindrical member 21 (with respect to the vehicle body 2).

Here, the turning members 22 comprise an upper turning section 22A in the form of an inverse T shaped case, and a lower turning member 22B in the form of an C shaped case, the upper portion of the lower turning member 22B being coupled with the lower portion of the upper turning member 22A to form an integral unit. By inserting the upper turning member 22A inside the cylindrical member 21 and supporting and guiding same by a bearing means 24, the turning member 22 is constituted rotatably about the vertical axis 23.

A lateral wheel drive shaft 25 is installed rotatably via bearing means 26 on the lower end portion of the aforementioned lower turning section 22B. By installing the rims 3A of the pair of front wheels 3 respectively on the outer ends of the wheel drive shafts 25, by means of coupling members 27, the front wheels 3 are installed together with the turning members 22 in a rotatable fashion about the vertical axis 23. In this way, a composition is achieved wherein the front wheels 3 are positioned practically directly below the vertical axis 23.

The pair of front wheels 3 are operatively connected to travel drive trains accommodated respectively within the turning radius 3a of the front wheels 3. More specifically, an electric motor (one example of a travel drive motor) 30 is provided in the upper part of the cylindrical member 21 (on the vehicle body 2), in a state wherein the drive shaft 31 thereof is positioned facing downwards towards the vertical axis 23 portion. Rotation transmission means 32 for operatively connecting the drive shaft 31 to the drive shaft 25 is provided in the turning member 22.

The rotation transmission means 32 comprises, in one example thereof, an upper rotating axle 33 positioned inside the upper turning section 22A and along the vertical axis 23, a coupling member 34 which couples the upper end portion of the upper rotating axle 33 to the drive shaft 31, a brake device 35 provided on a portion of the coupling member 34, a vertical, lower rotating axle 36 provided rotatably inside the lower turning section 22B, a reduction gear device 37 for coupling the lower end of the upper rotating axle 33 with the upper end of the lower rotating axle 36, a bevel gear device 38 for coupling the lower end of the lower rotating axle 36 with the inner end of the wheel drive shaft 25, and the like.

Rotating means for causing rotation of the turning member 22 are provided on the vehicle body 2. More specifically, the left- and right-hand turning members 22 are coupled by a link 40, or the like, and composed such that they are rotated by a common rotation cylinder (one example of rotating means) 41, and thereby the left- and right-hand front wheels 3 are steered mutually opposite directions to face directly sideways.

A battery 45 is mounted in the vehicle body 2, and a controller 46 is attached to this battery 45. Cables (power source supply component) 47 from the controller 46 are connected respectively to the aforementioned electric motors 30. In this way, the cables 47 are not linked to the turning members 22, and hence they can be installed in a straightforward and efficient manner.

The pair of rear wheels 4 are provided respectively on the vehicle body 2 in such a manner that they can be steered to 90( (steered to face directly sideways). More specifically, rims 4A of the pair of rear wheels 4 are installed respectively on vertical plate sections of inverted L-shaped turning members 50, in an freely turnable manner, and the lateral plate sections of the turning members 50 are provided rotatably about vertical axes 53 on the vehicle body 2, by means of a bearing 51 and a vertical axle 52. In this way, a composition is achieved wherein the rear wheels 4 are positioned practically directly below the vertical axes 53. Thereby, a composition is achieved wherein the pair of rear wheels 4 can be turned in a follow-up manner.

Below, the action of the first embodiment described above is explained.

Figure 1:
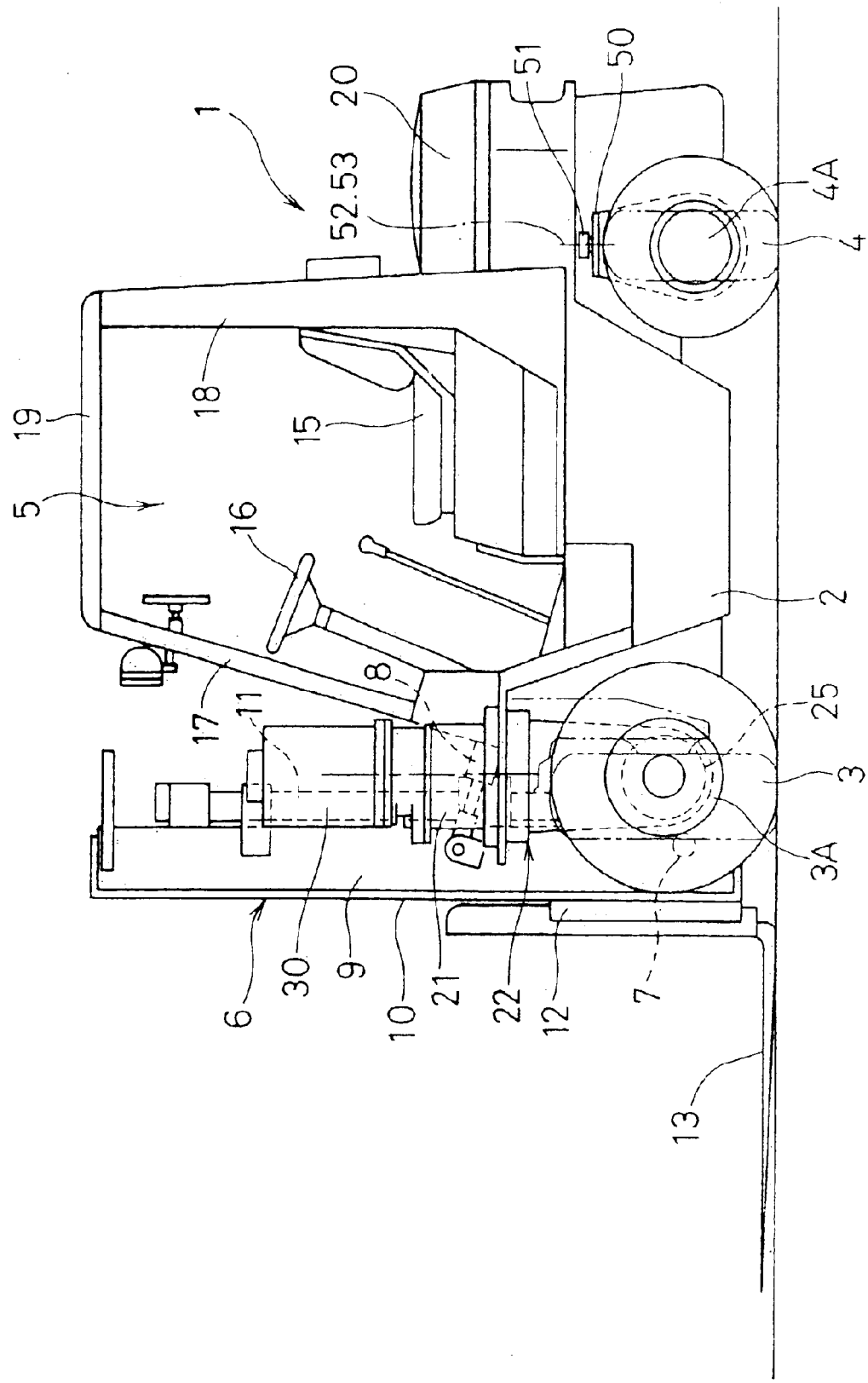
FIG. 1 is a side view of a work vehicle with lateral travel system during normal travel, illustrating a first embodiment of the present invention.
Figure 2:
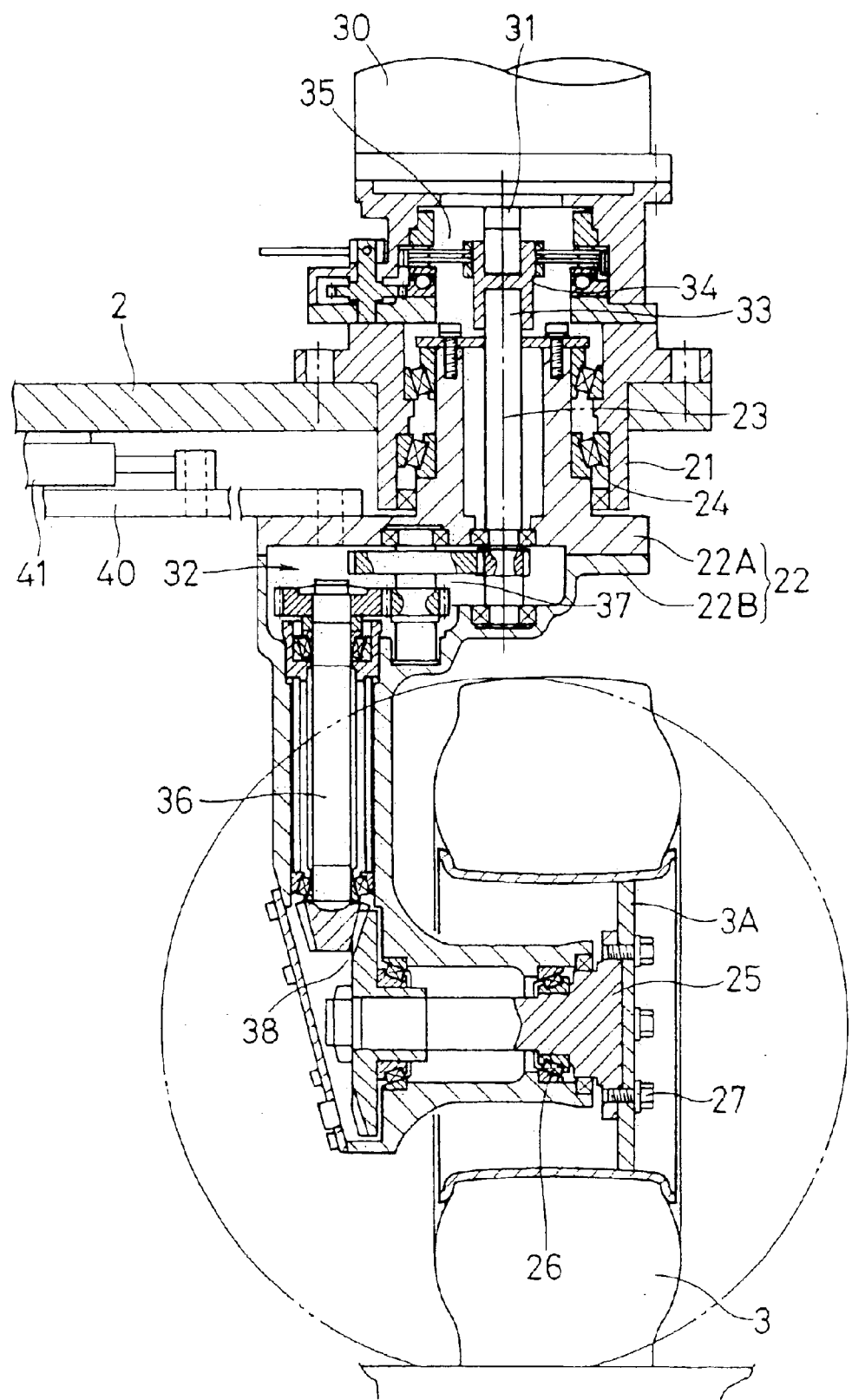
FIG. 2 is a partially cutaway front view of the front wheel section of the same work vehicle with lateral travel system.
Figure 3:
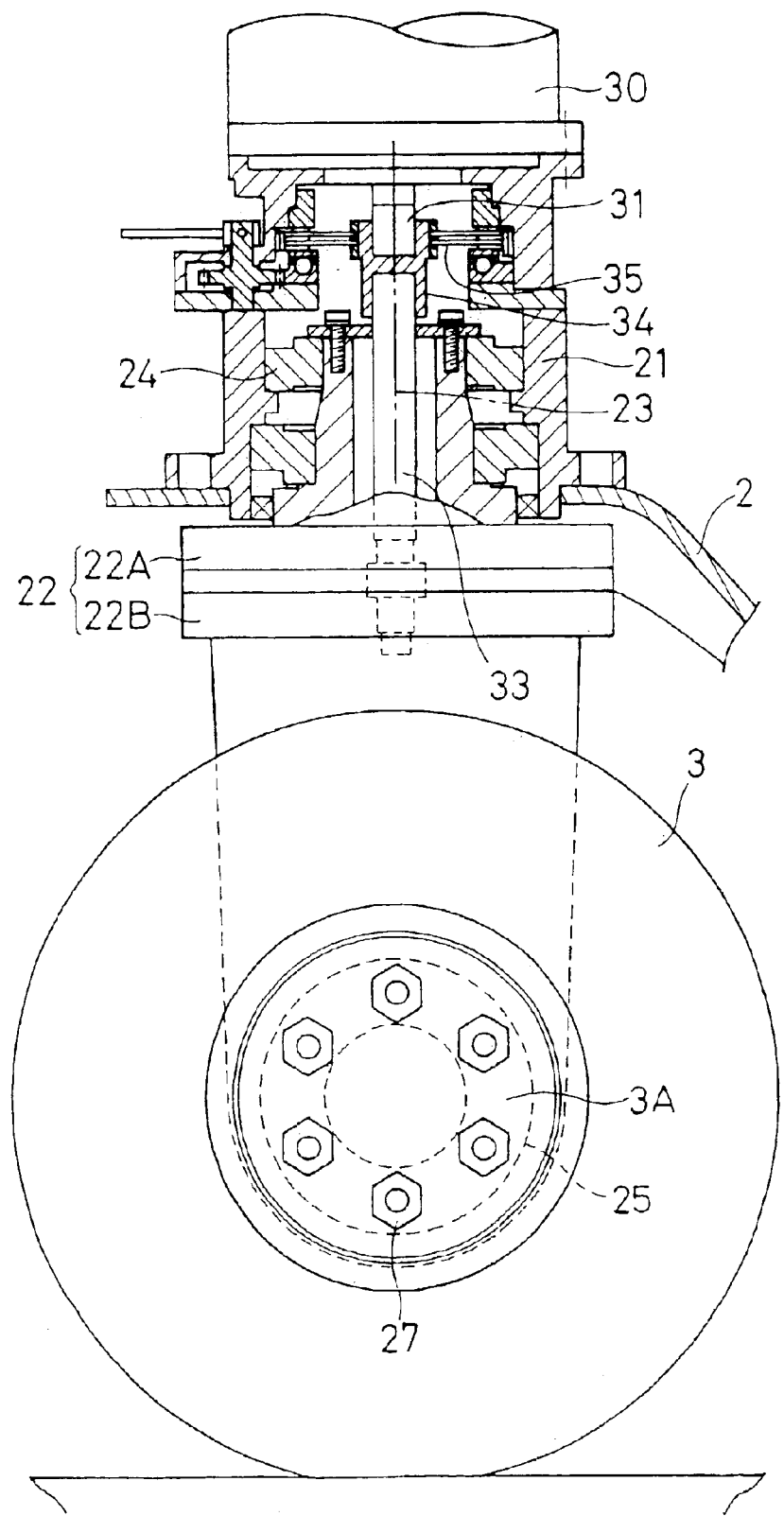
FIG. 3 is a partially cutaway side view of the front wheel section of the same work vehicle with lateral travel system.
Figure 4:
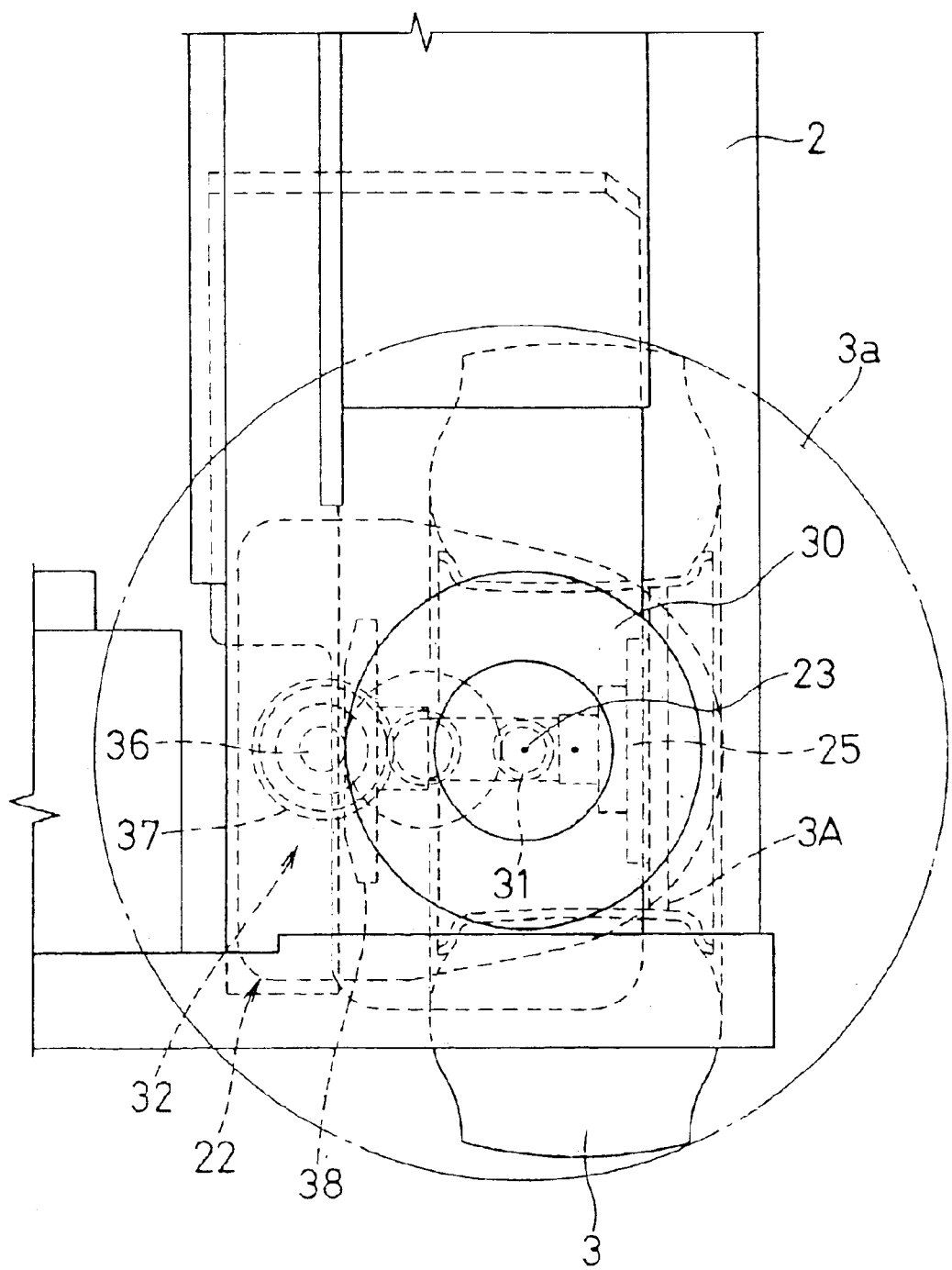
FIG. 4 is a plan view of the front wheel section of the same work vehicle with lateral travel system.
Figure 5:
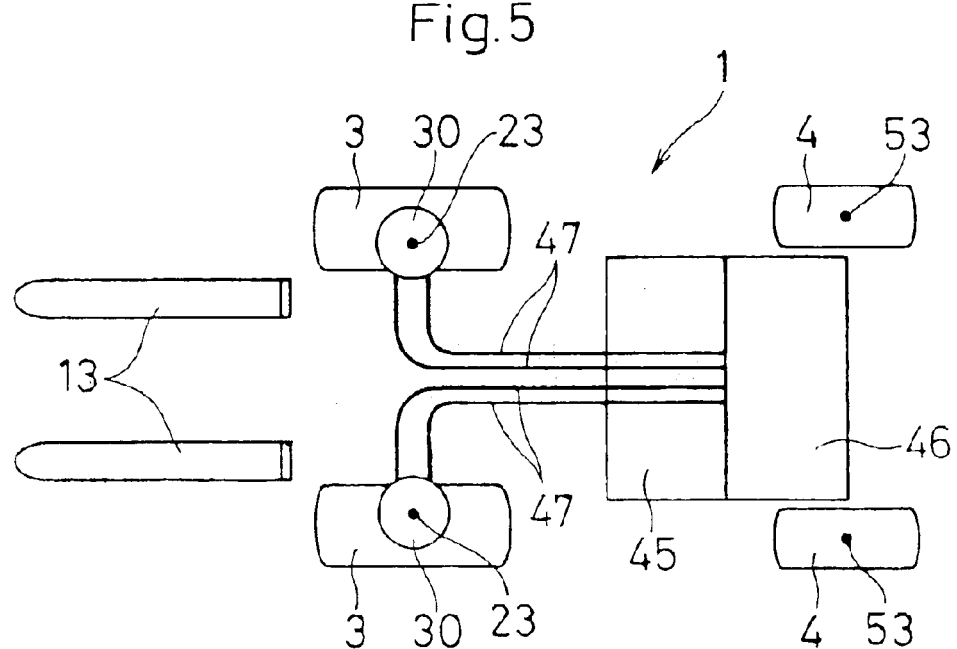
FIG. 5 is an schematic plan view of the same work vehicle with lateral travel system during normal travel.

The solid lines in FIG. 1 and FIG. 2, and the diagrams in FIG. 3 to FIG. 5 indicate a state of normal travel. In this case, the left- and right-hand front wheels 3 and the left- and right-hand rear wheels 4 are facing in the front/rear direction. When an operator sitting in the seat 15 of the driver's area 5 operates a steering wheel 16 in a fork lift 1 of this kind, the fork lift 1 travels.

More specifically, power from the battery 45 is controlled by the controller 46 and then supplied via the cables 47 to the respective electric motors 30, driving these electric motors 30, whereby the front wheels 3 are driven in the forward/reverse direction, by means of the rotation transmission means 32, and the like, and the fork lift 1 is thus caused to travel forwards or backwards.

During such operation, the rotation of the drive shaft 31 in each electric motor 30 is transmitted to the respective front wheel 3 by means of the coupling member 34, upper rotating axle 33, reduction gear device 37, lower rotating axle 36, bevel gear device 38 and wheel drive shaft 25. The vehicle can be halted appropriately by activating the brake device 35.

By operating a lift lever in order to activate the lift cylinder 11, the forks 13 can be raised or lowered along the masts 6, via the lift bracket 12, or the like, and thus prescribed fork lift operations can be performed. Moreover, by operating a tilt lever in order to activate the tilt cylinder 8, the masts 6 can be rotated (tilted) about the coupling axle 7, and thus the attitude of the forks 13 can be altered by means of the lift bracket 12, or the like.

Figure 6:
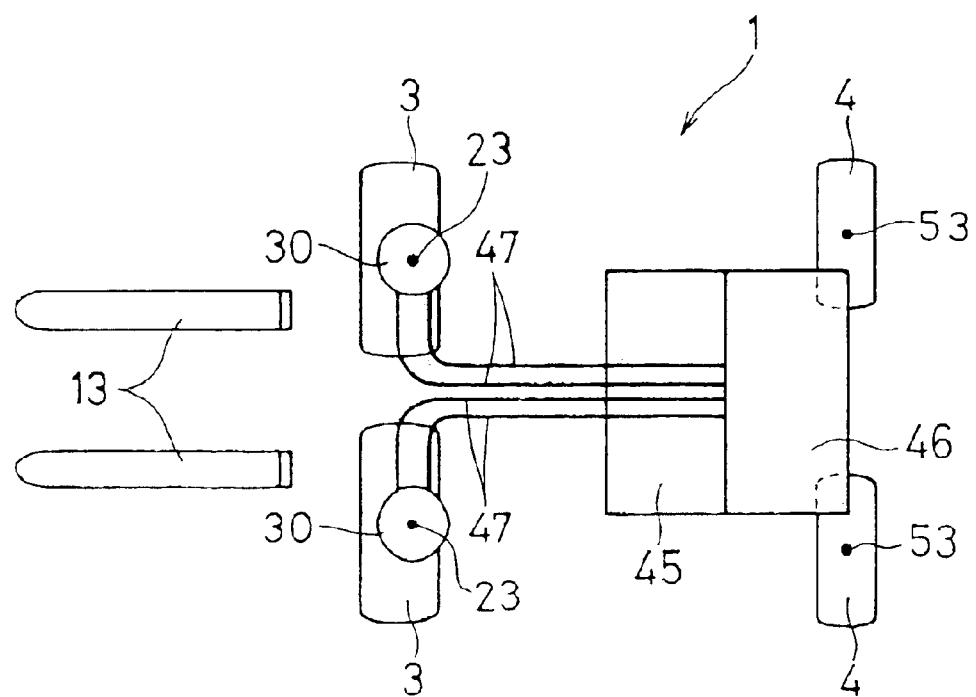
FIG. 6 is an schematic plan view of the same work vehicle with lateral travel system during lateral travel.

When switching from such normal travel to lateral travel, firstly, a lever-type lateral travel mode switch (not illustrated) is operated and by inclining this lever, rotation cylinder 41 is activated, the turning members 22 are caused to turn about the vertical axes 23, via the link 40, and consequently, the front wheels 3 are steered to a 90° position (facing directly sideways) with respect to the vehicle body 2, as illustrated by the dotted lines in FIG. 1 and FIG. 2, and by FIG. 6.

During such operation, the electric motors 30 are provided on the vehicle body 2, and by setting these electric motors 30 free and releasing the brake device 35, the front wheels 3 can be steered to a 90 ( orientation via the turning members 22, in a light, easy and smooth manner. Moreover, since the front wheels 3 are positioned practically directly below the vertical axes 23, the front wheels 3, and the like, can perform 90( steering in a compact fashion.

The steering of the front wheels 3 in this way, in other words, the fact that the front wheels 3 have been steered to a perfectly lateral orientation, is detected by sensors, and an indicator lamp is light, whereby lateral travel mode is enabled.

Therefore, by means of the operator sitting in the seat 15 of the driver's area 5 operating the steering wheel 16, similarly to the foregoing description, the electric power of the battery 45 is controlled by the controller 46 and then supplied respectively to the electric motors 30 via the cables 47, driving the electric motors 30 and causing the front wheels 3 to be driven in a forward/reverse direction via the rotation transmission means 32, or the like, and thus causing the fork lift 1 to travel in a lateral direction, rightwards or leftwards. In this case, the pair of rear wheels 4 turn in a follow-up manner.

By performing lateral travel in this manner, it is, for example, possible to readily convey long objects, by means of the forks 13. Correction of the linear progress during lateral travel can be achieved easily by slight adjustments of the angles of the front wheels 3, by means of forward and backward inclination of the lever to cause slight activation of rotation cylinder 41.

According to the first embodiment described above, by operatively connecting a pair of front wheels 3 to vertically orientated electric motors 30 accommodated respectively within the turning radius 3a of the front wheels 3, it is possible to make the overall composition compact, in addition to which the installation of the cables 47 to the electric motors 30 fixed to the vehicle body 2 can be performed without regard to the turning members 22, thus meaning that the cables 47 can be installed simply and efficiently.

Next, a second embodiment of the present invention is described with reference to FIG. 7 to FIG. 10. In the second embodiment, constituent elements which are the same or virtually the same as those of the first embodiment described above (FIG. 1. to FIG. 6) are labeled with the same reference numerals, and detailed description thereof is omitted here.

A pair of front wheels 3 are operatively connected to travel drive trains accommodated within the turning radius 3a of the front wheels 3. More specifically, the rims 3A of the pair of front wheels 3 are respectively installed directly on laterally orientated rotating flanges (one example of a drive axle) 62 of hydraulic motors (one example of a travel drive motor) 61, by means of coupling members 63, thereby operatively connecting the front wheels 3 to the hydraulic motors 61. Here, the hydraulic motors 61 are each formed to a size which can be accommodated inside the turning radius 3a.

A mount of each hydraulic motor 61 is installed in a lateral direction on a vertical plate section of an inverted L-shaped turning member 64, and a horizontal plate section of the turning member 64 is installed rotatably about a vertical axis 67 on the vehicle body 2, by means of a bearing device 65 and vertical axle 66. In this way, a composition is achieved wherein each of the front wheels 3 is positioned practically directly below the vertical axis 67.

The left- and right-hand turning members 64 are coupled by a link 40, or the like, and rotation is performed by means of a common turning cylinder (rotating means) 41, thereby achieving a composition wherein the left- and right-hand front wheels 3 are steered in mutually opposite directions in such a manner that they are facing directly sideways.

An engine 70 is provided on the vehicle body 2, and a pair of hydraulic pumps 71 driven by the engine 70 are also provided. Furthermore, the corresponding hydraulic pumps 71 and hydraulic motors 61 are connected by means of piping (hydraulic hoses, or the like) 72, in such a manner that the hydraulic pumps 71 each correspond to one hydraulic motor 61, in other words, in such a manner that a two-pump, two-motor type hydraulic drive system (HST system) is created.

Below, the action of the second embodiment described above is described.

Figure 7:
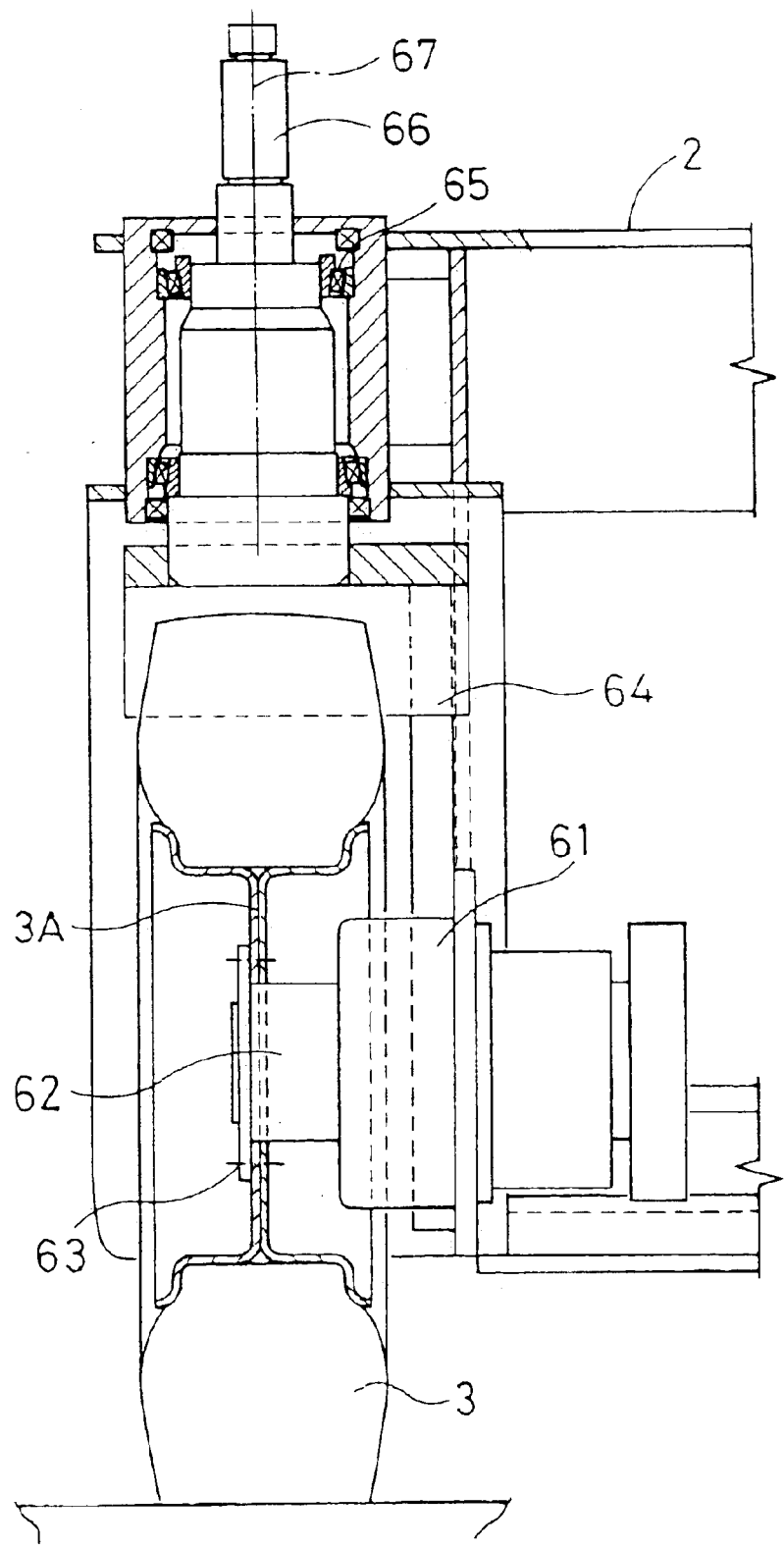
FIG. 7 is a partially cutaway front view of the front wheel section of the a work vehicle with lateral travel system, illustrating a second embodiment of the invention.
Figure 8:
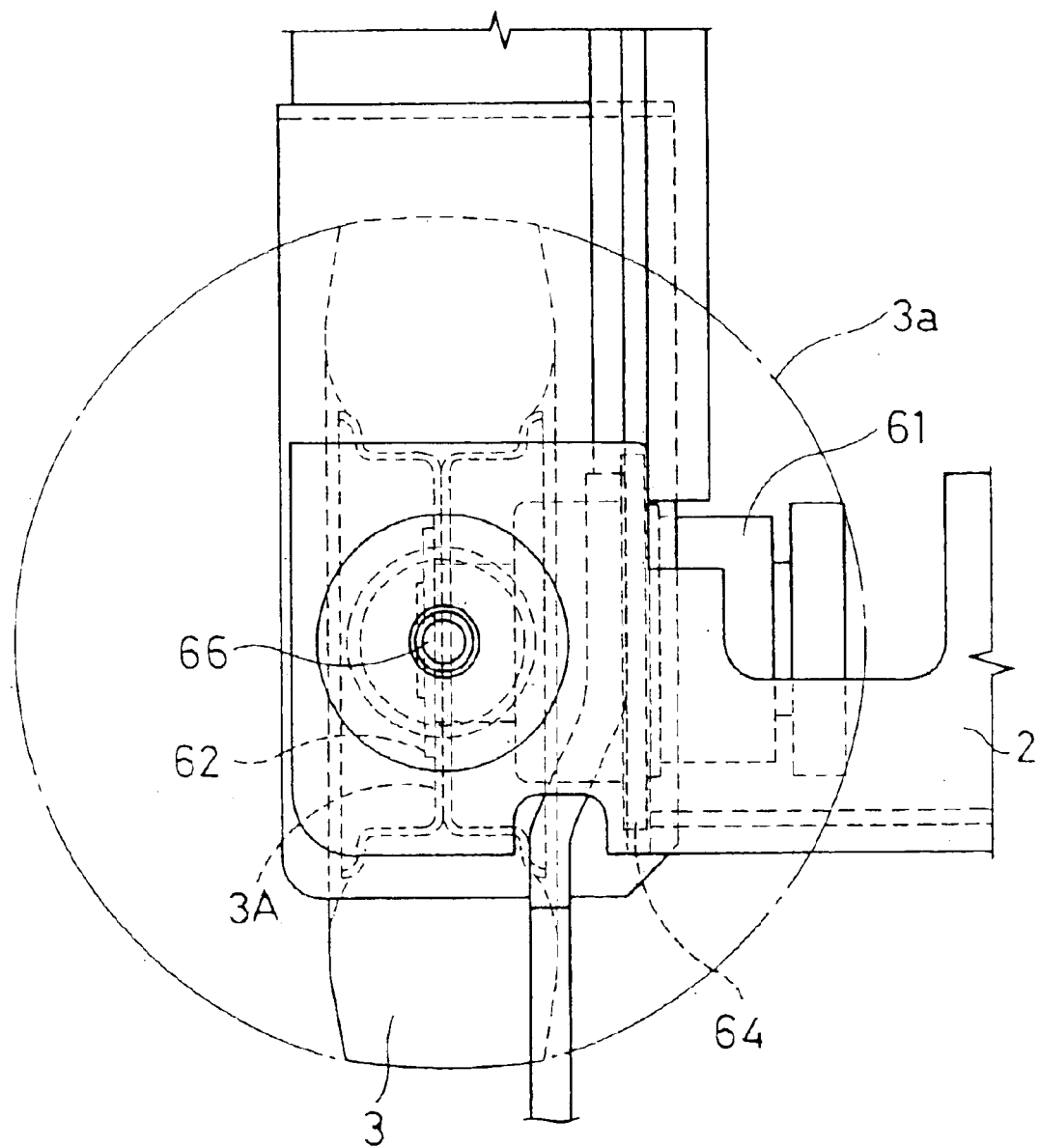
FIG. 8 is a plan view of the front wheel section of the same work vehicle with lateral travel system.
Figure 9:
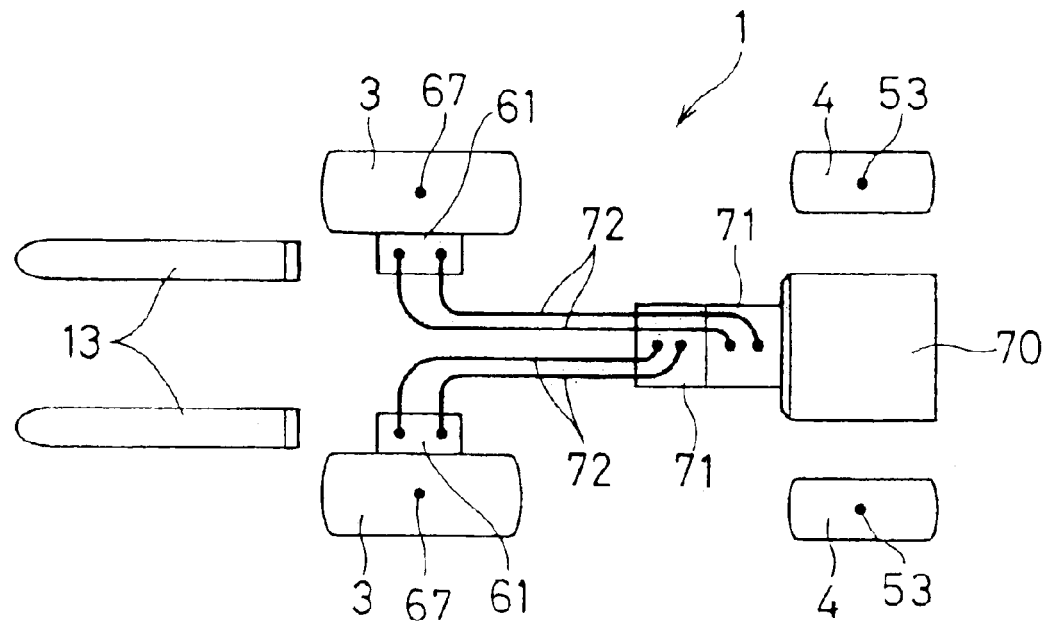
FIG. 9 is an schematic plan view of the same work vehicle with lateral travel system during normal travel.

FIG. 7, FIG. 8 and FIG. 9 show a state of normal travel. In this cases the left- and right-hand front wheels 3 and the left- and right-hand rear wheels 4 are facing in a front/rear direction. Therefore, by supplying the hydraulic pressure from the pair of hydraulic pumps 71 driven by the engine 70 to the corresponding hydraulic motors 61, via the piping 72, in accordance with the forward/reverse control implemented in the driver's area 5, the front wheels 3 are driven in a forward/reverse direction, and hence the forklift is caused to travel forwards or backwards.

Figure 10:
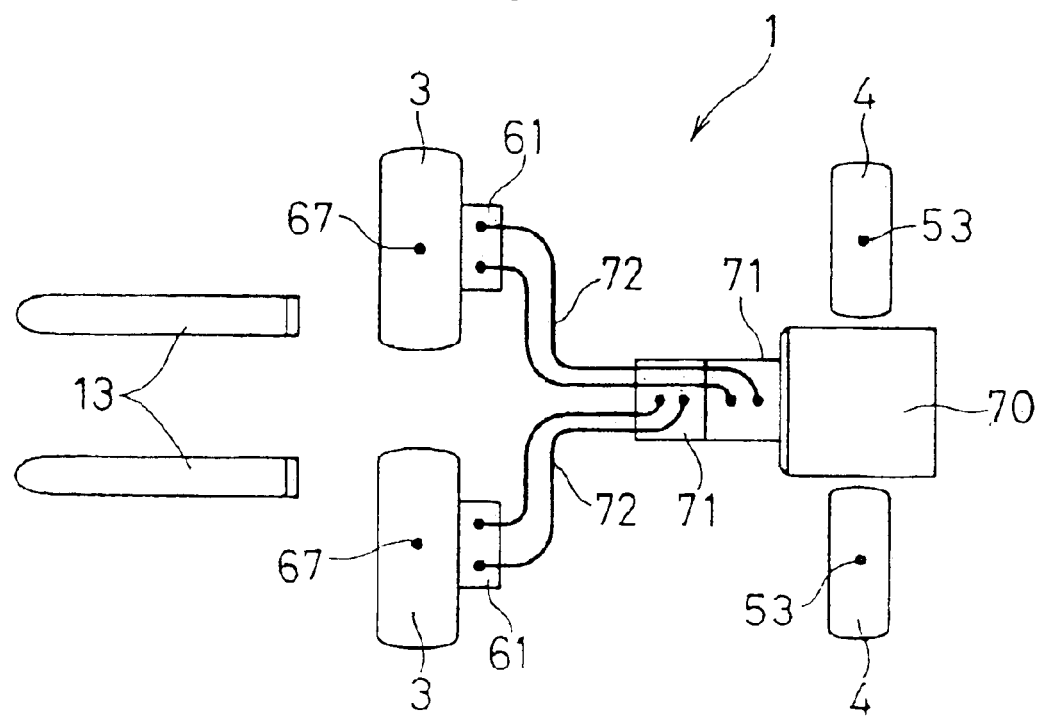
FIG. 10 is an schematic plan view of the same work vehicle with lateral travel system during lateral travel.

When the vehicle is switched from a normal travel mode of this kind to lateral travel, as shown in FIG. 10, the front wheels 3 are steered to a 90° position (facing directly sideways) with respect to the vehicle body 2. After steering the front wheels 3 in this way, by supplying hydraulic pressure from the hydraulic pumps 71 to the corresponding hydraulic motors 61, via the piping 72, the front wheels 3 are driven in the forward/reverse direction, and thus the fork lift 1 is caused to travel leftwards or rightwards. In this case, the pair of rear wheels 4 formed by rotating casters are steered freely.

According to the second embodiment described above, the pair of front wheels 3 are respectively operatively connected to laterally orientated hydraulic motors 61 which are accommodated within the turning radius of the front wheels 3, and hence the overall composition can be made compact. Moreover, since a two-pump, two-motor type hydraulic drive system is adopted as a drive method for the fork lift 1, steering during normal travel as described above is performed by controlling the direction of rotation and the rotational speed differential of the front wheels 3 by means of a steering wheel, but when performing lateral travel, this steering system is halted electrically.

Below, a third embodiment of the present invention is described with reference to FIG. 11 to FIG. 14. In the third embodiment constituent elements which are the same or virtually the same as the first embodiment described above (FIG. 1 to FIG. 6) are labeled with the same reference numerals, and detailed description thereof is omitted.

Front wheel turning means 80 for causing rotation of said steering member 22 is provided on the vehicle body 2. In other words, front wheel turning means 80 comprises a front wheel lateral travel cylinder 81, the main body 81a of this front wheel lateral travel cylinder 81 being installed swingably via a vertical pin 82 on the vehicle body 2, and the piston rod 81b thereof being coupled in a relatively rotatable fashion via a vertical coupling pin 84, to a link 83 fixed to one of the turning members 22. Two arms 85 provided on the left- and right-hand turning members 22 are mutually coupled in a relatively rotatable fashion by means of a link member 86 and coupling pins 87.

Consequently, by causing the turning members 22 to rotate via the link 83 due to operation of the front wheel lateral travel cylinder 81, one of the front wheels 3 is turned about the vertical axis 23 so as to face directly sideways, and the other front wheel 3 is also caused, via the arm 85, link member 86, and the like, to face directly sideways. In other words, by means of the front wheel turning means 80, a composition is achieved wherein the left- and right-hand front wheels 3 are both steered in mutually opposite directions so as face directly sideways, by means of the operation of common front wheel lateral travel cylinder 81. The aforementioned elements 81–87, and the like, constitute one example of front wheel turning means 80.

The pair of rear wheels 4 are provided such that they are respectively steerable through 90 degrees (steerable in a perfectly lateral direction) with respect to the vehicle body 2. In other words, the rims 4A of the pair of rear wheels 4 are provided in such a manner that they can each turn freely with respect to the vertical plate section of an inverted L-shaped turning member 90, by means of a laterally oriented wheel shaft 91, or the like, and furthermore, the horizontal plate section of either turning member 90 is provided rotatably about a vertical axis 94 with respect to the vehicle body 2, by means of a bearing 92 and a vertical axle 93. In this way, a composition is achieved wherein the rear wheels 4 are positioned virtually directly below the vertical axes 94.

Rear wheel turning means 100 for causing the pair of rear wheels 4 to rotate about the vertical axes 94 is provided, this rear wheel turning means 100 being constituted by a steering cylinder 101 and a rear wheel lateral travel cylinder 103, or the like.

In other words, the main body 101a of the steering cylinder 101 is disposed in the lateral direction of the vehicle, and a piston rod 101c coupled to the piston 101b of the steering cylinder 101 projects to the outer sides in the lateral direction of the vehicle. The projecting ends of the piston rod 101c are respectively fixed to the vehicle body 2, by means of supporting frames 102, thereby achieving a composition wherein the main body 101a is movable in the lateral direction of the vehicle.

A pair of rear wheel lateral travel cylinders 103 is provided on the right- and left-hand sides, respectively, the respective main bodies thereof 103*a* being integrated (coupled) with the main body 101*a* of the aforementioned steering cylinder 101, by means of coupling members 104. In this case, piston rods 103*c* coupled to the pistons 103*b* of the rear wheel lateral travel cylinders 103 project respectively to the outer sides in the lateral direction of the vehicle. An arm member 105 provided on the upper end of the aforementioned vertical axle 93 and the projecting end of the piston rod 103*c* are mutually coupled in a relatively rotatable fashion, by means of a link 106 and vertically orientated coupling pins 107, 108, and the like.

According to the aforementioned rear wheel turning means 100, the operation of the steering cylinder 101 is performed by moving the main body 101*a* in the lateral direction of the vehicle with respect to the fixed piston rod 101*c*, and the main bodies 103*a* of the rear wheel lateral travel cylinders 103 are moved in the lateral direction of the vehicle, together with the main body 101*a* of the steering cylinder 101. In this case, guide members (not illustrated) through which the coupling members 104 pass are provided on the supporting frames 102, and these guide members serve to guide the movement of the main bodies 101*a*, 103*a* and prevent rotation thereof.

In this composition, the operation of the aforementioned steering cylinder 101 is performed by Orbitrol (hydrostatic power steering) by turning a steering wheel 16. Moreover, a composition is adopted wherein the rear wheel lateral travel cylinders 103 are provided as a pair on the left- and right-hand sides, respectively, which permit independent rotation of the rear wheels 4 by operating a control valve when the steering cylinder 101 is in a neutral position, in such a manner that prescribed non-working attitudes can be adopted when the steering cylinder 101 is operated.

Consequently, by operating the rear wheel lateral travel cylinders 103 and thus causing the vertical axles 93 to rotate, by means of the link 106 and arm members 105, and the like, the rear wheels 4 are steered about the vertical axes 94 by means of the turning members 90, and the like, and can faced directly sideways. In other words, a composition is achieved wherein the left- and right-hand rear wheels 4 can be mutually steered in the same direction in order to face directly sideways, by operation of the rear wheel lateral travel cylinders 103. The aforementioned elements 101–108, and the like, constitute one example of rear wheel turning means 100 for causing the pair of rear wheels 4 to rotate about the vertical axes 94.

A battery 110 is mounted on said vehicle 2. This battery 110 has a T shape in plan view, being constituted by a broad front section 110*a* which is movable in the lengthwise direction of the vehicle, between the two rear wheels 4 when in linear travel position, and a narrow rear section 110*b* which can be positioned between the two rear wheels 4 when in lateral travel position. The rear section of the vehicle body 2 comprises a battery accommodation section 2*a* which is U-shaped in rear view, and in this case, cutaway sections 2*b* which permit rotation of the rear wheels 4 are formed in the rear end portion of this battery accommodation section 2*a*. A detachable lid member 2*d* is provided in a rear end opening section 2*c* of the battery accommodation section 2*a*.

Consequently, in a state where the rear wheels 4 are in the linear travel position and the lid member 2*d* has been detached, the battery 110 can be installed or detached in the longitudinal direction of the vehicle, from the rear end of the vehicle, in which case the broad front section 110*a* is able to pass between the two rear wheels 4 without obstruction. Moreover, when the battery 110 has been installed, the narrow section 110*b* is positioned between the rear wheels 4, and steering of the rear wheels 4 to a lateral travel position can be performed without obstruction.

A controller 111 is attached to the aforementioned battery 110. A cable (power source supply component) 112 is connected respectively from the controller 111 to each electric motor 30. The cables 112 are not attached to the turning members 22, and consequently, they can be installed simply and efficiently. The rear wheel turning means 100 is provided so as to be positioned over the battery 110.

Below, the action of the third embodiment described above is explained.

Figure 11:
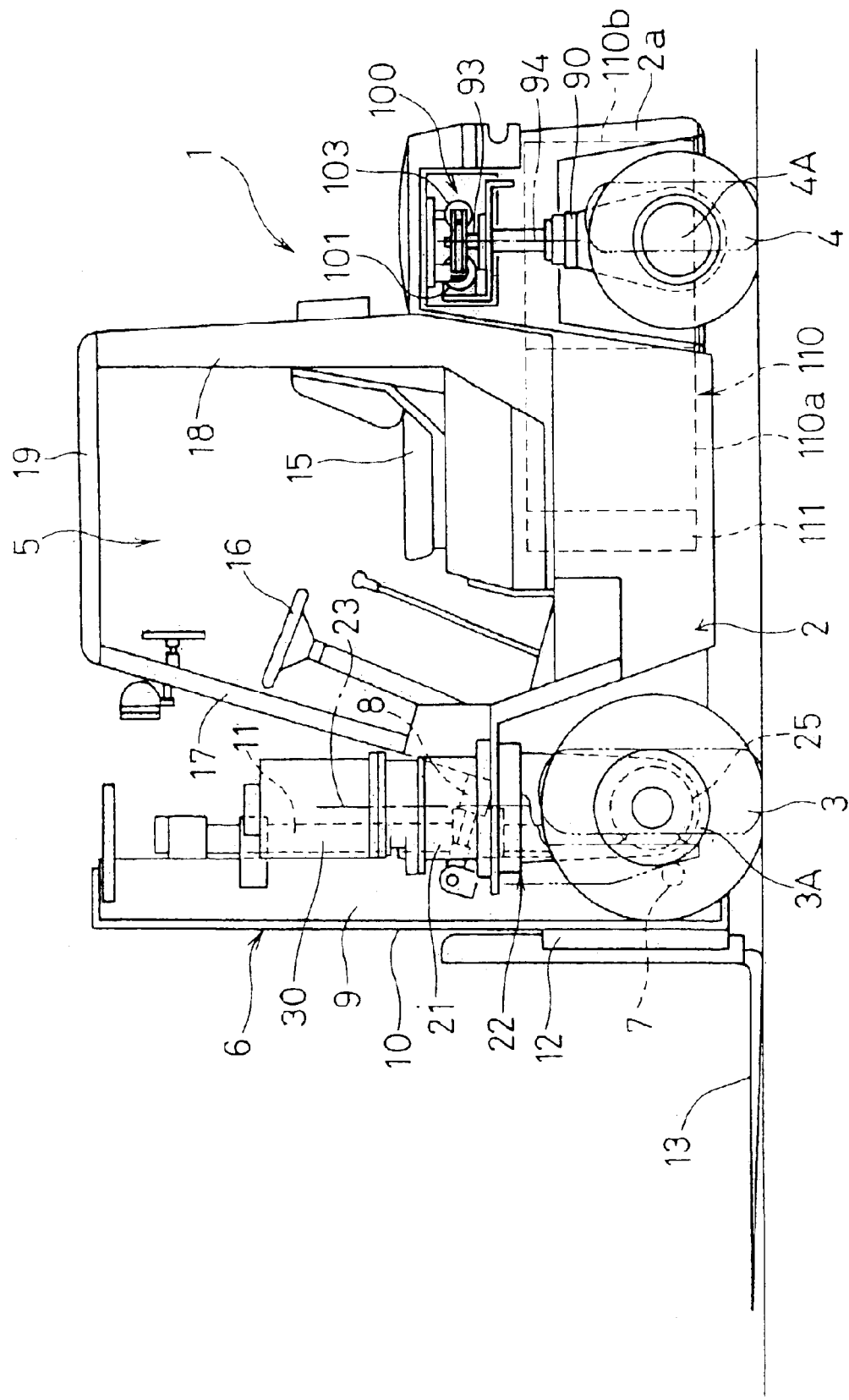
FIG. 11 is a side view of a work vehicle with lateral travel system during normal travel, illustrating a third embodiment of the present invention.
Figure 12:
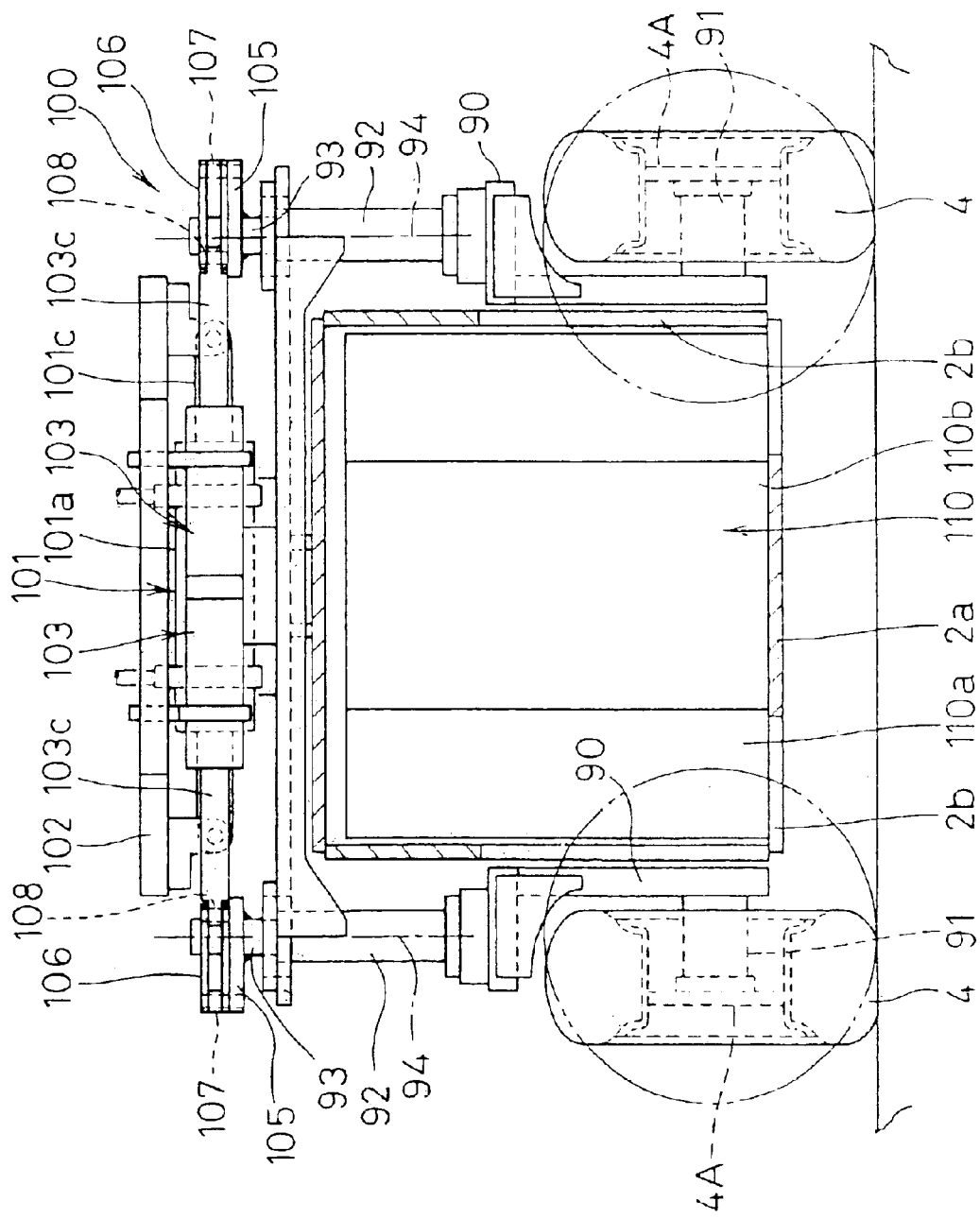
FIG. 12 is a rear view of the rear wheel section of the same work vehicle with lateral travel system.
Figure 13:
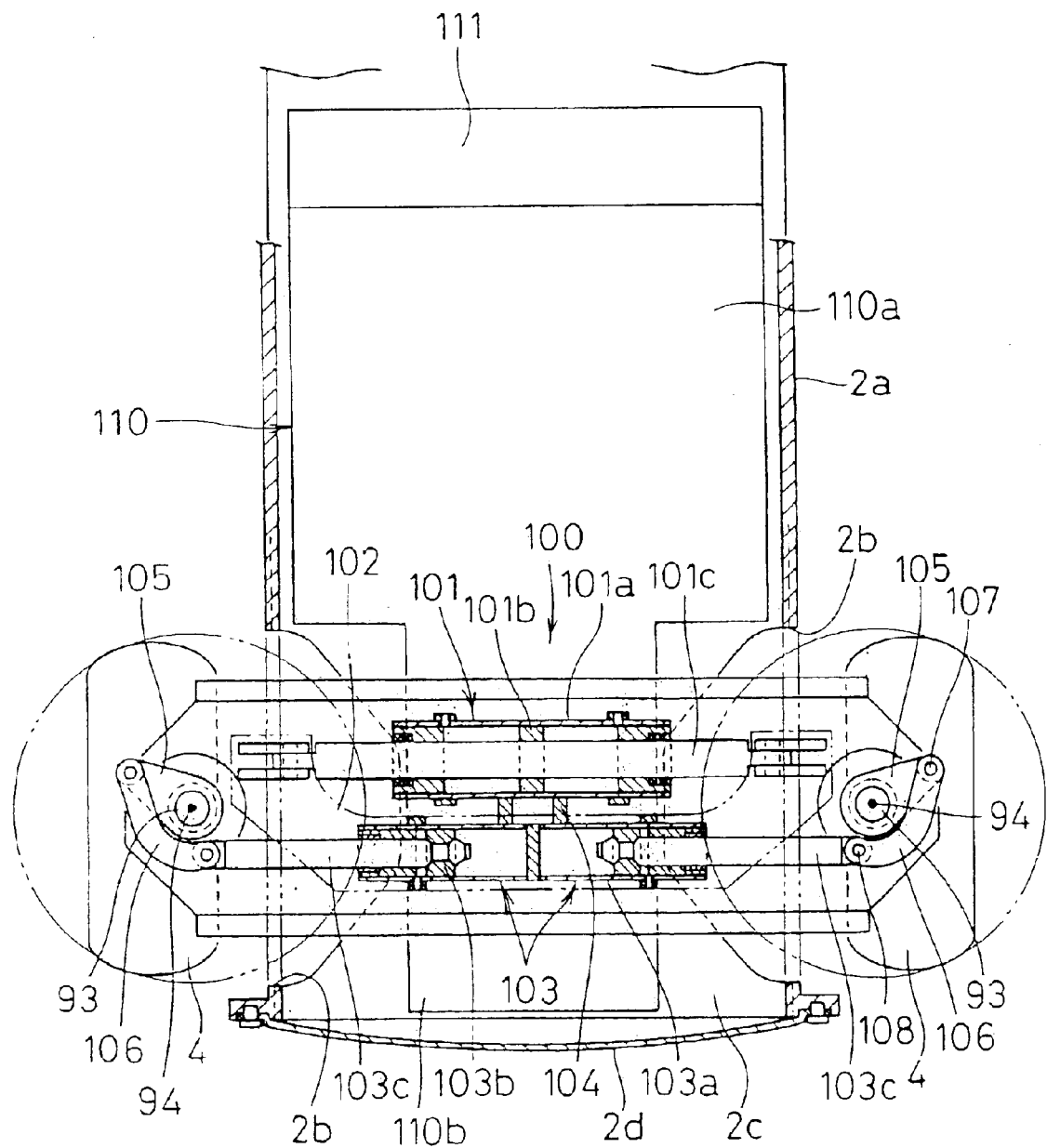
FIG. 13 is a partially cutaway plan view of the rear wheel section of the same work vehicle with lateral travel system.

The solid lines in FIG. 11 and FIG. 12, and the diagrams in FIG. 13 and FIG. 14(*a*) indicate a state of normal travel. In this case, the left- and right-hand front wheels 3 and the left- and right-hand rear wheels 4 are orientated in the front/rear direction. A fork lift 1 of this kind can be caused to travel by means of an operator sitting in the seat 15 of the driver's area 5 operating the steering wheel 16. In other words, by driving the electric motors 30 by controlling the electrical power of the battery 110 by means of a controller 111 and supplying it respectively to the electric motors 30 via the cable 112, the front wheels 3 are driven in the forward/reverse direction by means of rotation transmission means 32, or the like, and thus fork lift 1 is caused to travel forwards/backwards.

In the aforementioned travelling movement, turning is performed in accordance with the operation of a steering wheel 16. In other words, by turning the steering wheel 16 to the left, for example, the main body 101*a* of the steering cylinder 101 is moved to the left-hand side by the Orbitrol, and the main bodies 103*a* of the two rear wheel lateral travel cylinders 103 are caused to move integrally to the left-hand side, by means of the coupling member 104. In this case, the rear wheel lateral travel cylinders 103 are in a non-operational attitude at a prescribed level of compression and serve a link-type function. Therefore, the leftward movement of the two rear wheel lateral travel cylinders 103 is transmitted via the link 106 to the arm members 105, and thus the turning members 90 are caused to turn about the vertical axes 94 and the rear wheels 4 are steered and turned in a leftward direction.

Moreover, when the two rear wheel lateral travel cylinders 103 are compressed to an intermediate position, the two turning members 90 are caused to turn in mutually opposite directions about the vertical axes 94, the left- and right-hand rear wheels 4 are steered in oblique directions in such a manner that the outer edges thereof are advanced slightly forwards, and thus steering can be performed at this position. Similarly to the foregoing description, the wheels can also be steered to the right, by turning the steering wheel 16 to the right, for example.

When the vehicle is switched from normal travel mode of this kind to lateral travel, firstly, the steering cylinder 101 is set to the neutral (linear movement) position illustrated in FIG. 13. In this state, a lever-type lateral travel mode switch (not illustrated), for example, is operated, and the front wheel turning means 80 and rear wheel turning means 100 are operated.

In other words, in the front wheel turning means 80, the front wheel lateral travel cylinder 81 is operated by operating the lever-type lateral travel mode switch and tilting the lever, the steering members 22 are caused to rotate about the vertical axes 23, by means of the link 83, and thus the front wheels 3 are steered to a 90 ( position (facing directly sideways) with respect to the vehicle body 2, as illustrated by the dotted lines in FIG. 11 and by FIG. 14(*b*).

Moreover, in the rear wheel turning means 100, the two rear wheel lateral travel cylinders 103 are compressed by means of the control valves, the intake movement of the piston rods 103*c* is transmitted via the links 106 to the arm members 105, and the turning members 90 are caused to rotate about the vertical axes 94, thus steering the rear wheels 4 to a 90 ( position (facing directly sideways) with respect to the vehicle body 2, as illustrated by the dotted lines in FIG. 11 and FIG. 12, and by FIG. 14(b).

The steering of the front wheels 3 and rear wheels 4 in this manner, in other words, the steering of the front wheels 3 and rear wheels 4 to a position facing directly sideways, is detected by sensors, an indicator lamp is lit, and thereby, a lateral travel mode can be assumed.

Consequently, by means of an operator sitting in the seat 15 of the driver's area 5 operating the steering wheel 16, similarly to the foregoing description, the electrical power of the battery 110 is controlled by the controller 111 and then supplied respectively to the electrical motors 30 via cables 112, driving the electrical motors 30, thus causing the front wheels 3 to be driven in a forward/reverse direction by means of a rotation transmission means 32, and the like, and hence the fork lift 1 is caused to travel laterally in a leftward or rightward direction. In this case, the pair of rear wheels 4 turn freely.

In the fork lift 1 described above, since the broad front part 110a of the battery 110 can be moved between the rear wheels 4 when in a linear travel position, in the longitudinal direction of the vehicle, without obstruction, then the installation or removal of the battery 110 to and from the battery accommodation section 2a can be performed readily and swiftly, from the rear direction of the vehicle, and hence maintenance can be performed readily. Moreover, since the narrow rear section 110b of the battery 110 mounted in the battery storage section 2a is positioned between the rear wheels 4, steering of the rear wheels 4 to the lateral travel position can be performed without obstruction, and moreover, since the battery 110 can be mounted at the rear end of the vehicle body 2, to the rear of the seat 15, it is possible to mount a large battery in the lower part of the vehicle body 2, and hence the center of gravity is lowered and a stable fork lift 1 is achieved.

In the respective embodiments described above, a counter type fork lift 1 is described as a type of work vehicle, but the invention may be applied in a similar manner to other work vehicles, such as large-scale transporters, loaders, side fork lifts, and the like.

According to the first and third embodiments described above, by operatively connecting the pair of front wheels 3 respectively to vertically oriented electric motors accommodated inside the turning radius 3a of the front wheels 3, the overall composition can be made compact. Moreover, the installation of the cables 47, 112 to the electric motors 30 fixed to the vehicle body 2 is performed without relation to the turning members 22, and therefore said installation can be performed simply and efficiently.

However, it is also possible to adopt a composition wherein the electric motors 30 are installed on the turning members 22, and the rims 3A of the front wheels 3 are operatively connected to the laterally orientated drive axles 31. In this case, when the front wheels 3 are steered to a 90 ( position with respect to the vehicle 2, the front wheels 3 can be steered smoothly and easily, since they are formed integrally with the respective electric motors 30.

In the respective embodiments described above, a configuration is described which comprises common rotating means 41, 80 for causing a pair of front wheels 3 to rotate simultaneously, but it is also possible for the pair of front wheels 3 to be caused to rotate independently, by respective rotating means.

In the second embodiment described above, the pair of front wheels 3 are operatively connected to hydraulic motors 61 accommodated within the turning radius 3a of the front wheels 3, but it is also possible to adopt electric motors as the travel drive trains.

In the first and second embodiments described above, a turning caster configuration which turns freely is adopted for the pair of rear wheels 4, but it is also possible to adopt a configuration wherein, similarly to the front wheels 3, they are steered forcibly by a cylinder, or the like, as indicated in the second embodiment.

In the third embodiment described above, a configuration is described wherein common rear wheel turning means 100 for rotating the pair of rear wheels 4 simultaneously is provided, but it is also possible for one of the pair of front wheels 4 to be formed as a wheel which is steered by means of a steering wheel, whilst forming the other of the rear wheels 4 as a rotatable caster type wheel, in which case, when switching to lateral travelling, the first of the rear wheels 4 is forcibly steered by means of a cylinder, or the like.

What is claimed is:

1. A work vehicle with a lateral travel system, comprising:

a vehicle body;

a pair of front wheels disposed on the left- and right-hand sides of said vehicle body and being steerable to a 90 degree position, the pair of front wheels being installed rotatably about vertical axes with respect to the vehicle body;

a pair of rear wheels disposed on the left- and right-hand sides of said vehicle body in such a manner that they are steerable to a 90 degree position, the pair of rear wheels being provided rotatably about vertical axes with respect to the vehicle body;

a front wheel turning apparatus for rotating said front wheels;

a rear wheel turning apparatus for rotating said rear wheels; and a battery mountable in the vehicle body comprising a broad front section which is movable in the lengthwise direction of the vehicle between the rear wheels when in a forward/reverse travel attitude, and a narrow rear section which can be positioned between the rear wheels when in a lateral travel attitude.

2. The work vehicle with a lateral travel system according to claim 1, and further including turning members having vertical axes for each of said front wheels, said pair of front wheels being installed on said turning members for rotation about said vertical axes with respect to said vehicle body, wherein the pair of front wheels are installed respectively on the turning members by laterally oriented wheel drive shafts, travel drive motors being provided on said vehicle body in a state wherein drive shafts thereof are positioned on the vertical axis of the respective turning members and face downwardly, and rotation transmission apparatus provided in said turning member for operatively connecting the drive shafts of the motors to the front wheels.

3. The work vehicle with a lateral travel system according to claim 1, wherein masts are provided on the front end of the vehicle body and forks are provided on said masts.

* * * * *